(12) United States Patent
King

(10) Patent No.: US 6,446,576 B1
(45) Date of Patent: *Sep. 10, 2002

(54) AUTOMATIC WATER BOWL FOR PETS

(76) Inventor: Wayne King, c/o 866 Main Street East, Hamilton, Ontario (CA), L8M 1L9

( * ) Notice: Subject to any disclaimer, the term of this patent is extended or adjusted under 35 U.S.C. 154(b) by 0 days.

This patent is subject to a terminal disclaimer.

(21) Appl. No.: 09/925,495

(22) Filed: Aug. 10, 2001

(51) Int. Cl.[7] .............................................. A01K 29/00
(52) U.S. Cl. ...................................................... 119/162
(58) Field of Search .......................... 119/74, 161, 162; 4/341, 420.1

(56) References Cited

U.S. PATENT DOCUMENTS

| | | | | |
|---|---|---|---|---|
| 363,494 A | * | 5/1887 | White et al. .................. | 4/341 |
| 3,045,248 A | * | 7/1962 | Gentry ........................ | 4/420.1 |
| 5,301,374 A | * | 4/1994 | Smiley ......................... | 4/341 |
| 5,904,117 A | * | 5/1999 | Castro ......................... | 119/51.5 |
| 6,101,976 A | * | 8/2000 | Gustin ......................... | 119/74 |
| 6,101,977 A | * | 8/2000 | Matz ............................ | 119/74 |
| 6,205,950 B1 | * | 3/2001 | Thompson, Jr. ............. | 119/51.5 |
| 6,253,709 B1 | * | 7/2001 | King ............................ | 119/74 |

* cited by examiner

*Primary Examiner*—Charles T. Jordan
*Assistant Examiner*—Danielle Rosenthal

(57) ABSTRACT

An automatic pet watering device installed on the toilet bowl of a conventional toilet, consisting of a conventional toilet bowl having a top cap connected to an outlet for releasing water, a hollow tube extending from the top cap and above the water line and through the toilet bowl and having an end portion bent in a downward position, a water bowl located near the toilet bowl below the hollow tub, the water bowl having an open end and a bottom end, the first end of the water tube connected to the bottom of the water bowl and extending vertically and connected through the toilet bowl and bent downwardly to a point below the water line of the toilet bowl.

8 Claims, 5 Drawing Sheets

AUTOMATIC WATER BOWL FOR PETS

FIELD OF THE INVENTION

This invention relates to providing water for pets and more particularly to an automatic watering device connected to a toilet bowl.

BACKGROUND OF THE INVENTION

It is common for pets, when left alone, to drink from toilet bowls. This practice subjects pets and their owners to contamination from the bacterial with the toilet bowl. In some cases, the pet can fall into the toilet bowl and drown. Pet owner's attempts to keep the pet (especially in the case of larger canines) from drinking from the bowl by keep the lid down, are often thwarted by the animals'ability to lift the lid in order to drink.

The prior art includes a limited number of devices for attachment to a conventional toilet bowl or toilet seat for cleaning and irrigating the anal and/or genital areas of a user. Examples of such prior art bidet attachments are shown and described in U.S. Pat. No. 5,142,711 to Parikh, U.S. Pat. No. 5,101,520 to Lockhard, U.S. Pat. No. 5,090,067 to Cogdill, U.S. Pat. No. 3,045,248 to Gentry, and U.S. Pat. No. 3,195,148 to Merkel Jr.; each of which discloses an attachment or assembly for mounting either on the upper surface of a toilet bowl or the under surface of a toilet seat for cleaning and irrigating the anal and/or genital areas.

SUMMARY OF THE INVENTION

The instant invention is not a bidet. It is an automatic watering device which is separate from, yet connected to the water supply and drainage system of a common toilet. By drawing from the water supply of the toilet, the watering device is replenished whenever the flushing system of the toilet is activated and by the virtue of its connection at its lowest point by an "S" shaped tube to the drainage side of the toilet, it is simultaneously drained. The "S" shaped tube, by acting as a buffer between the water level in the toilet bowl and the level in the watering device, permits the watering device to refill to its operational level and prevents back-flow contamination of the pet's drinking water.

The instant invention requires, for its installation only minor modifications to an existing toilet. Two small holes are used as inlet and drain holes respectively, and standardly available flexible tubing can be affixed into the holes and sealed with modern sealing adhesives. The bowl portion of the watering device can be mounted by various attachment means in location adjacent to the existing toilet.

The instant invention provides a unique and cost-effective method of providing fresh drinking water for pets. Unlike conventional water containers, which can be overturned or otherwise emptied, the watering device described herein provides a stable and clean watering means to household pets. The invention is easily installed on an ordinary household toilet.

It is therefore an object of the present invention to provide an automatic pet watering device.

Another object of the invention is to provide an automatic pet watering device which can be easily installed on the toilet bowl of a conventional toilet.

It is another object of the present invention to provide an automatic pet watering device which is simple and inexpensive to manufacture and install.

These objects as well as other aspects, objects and advantages of the present invention will become apparent to those skilled in the art after reading the following description of the preferred embodiments in conjunction with the accompanying drawings, and the appended claims.

The present invention an automatic pet watering device installed on a conventional toilet having a top cap, said watering device comprises:
 (a) a water bowl in fluid communication with a top cap of a toilet;
 (b) said water bowl receiving clean water from a top cap of a toilet during flushing of a toilet;
 (c) said water bowl further including a water outlet means for discharging excess water to said toilet drain; and
 (d) whereby flushing said toilet automatically fills said water bowl and if necessary simultaneously empties a quantity of water to achieve a preselected water level in the water bowl.

Preferably wherein said outlet means in fluid communication with the toilet air trap such that the water level in the water bowl is established above or below the standing water level in the toilet bowl.

Preferably wherein said outlet means in fluid communication with the toilet bowl such that the water level in the water bowl is established at substantially the standing water level in the toilet bowl.

Preferably wherein said outlet means in fluid communication with the toilet down spout such that the water level in the water bowl is established at or below the standing water level in the toilet bowl.

Preferably wherein said outlet means further includes an outlet orifice defining the location where s aid outlet means empties into said down spout, said outlet orifice located such that the water level in the water bowl is established at or below the standing water level in the toilet bowl.

Preferably wherein said outlet means further includes a hollow tube, including one end in fluid communication with the bottom of said water bowl and the other end in fluid communication with said outlet orifice.

Preferably wherein said water bowl is located near a side of said toilet bowl and fastened to said toilet bowl with a vertical support and a horizontal support.

In an alternate embodiment the present invention an automatic pet watering device installed on the toilet bowl of a conventional toilet said watering device comprises:
 (a) a water inlet and water outlet means in communication with an external water source, and having outlet means;
 (b) a toilet bowl having a top cap connected to said outlet means, for releasing water from said water source;
 (c) a hollow tube extending from said top cap and above the water line of said toilet bowl and through said toilet bowl for conducting water from said source, said hollow tube having an end portion bent in a downward position;
 (d) a water bowl located near said toilet bowl and below said hollow tube end potion, sad water bowl having an open end and a bottom end,
 (e) a first end of a water tube connected to said bottom end of said water bowl and a second end extending vertically and connected through said air trap and bent downwardly to a point above or below the water line of said toilet bowl;
 (f) whereby flushing said toilet automatically fills said water bowl and simultaneously empties a quantity of water.

In an alternate embodiment the present invention an automatic pet watering device installed on the toilet bowl of a conventional toilet, said watering device comprises:

(a) a water inlet and water outlet means in communication with an external water source, and having outlet means;

(b) a toilet bowl having a top cap connected to said outlet means, for releasing water from said water source;

(c) a hollow tube extending from said top cap and above the water line of said toilet bowl and through said toilet bowl for conducting water from said source, said hollow tube having an end portion bent in a downward position;

(d) a water bowl located near said toilet bowl and below said hollow tube end portion, said water bowl having an open end and a bottom end, (e) a first end of a water tube connected to said bottom end of said water bowl and a second end extending vertically and connected through said down spout and bent downwardly to a point below the water line of said toilet bowl;

(f) whereby flushing said toilet automatically fills said waterbowl and simultaneously empties a quantity of water.

DETAILED DESCRIPTION OF THE PREFERRED EMBODIMENT

Figure 1:
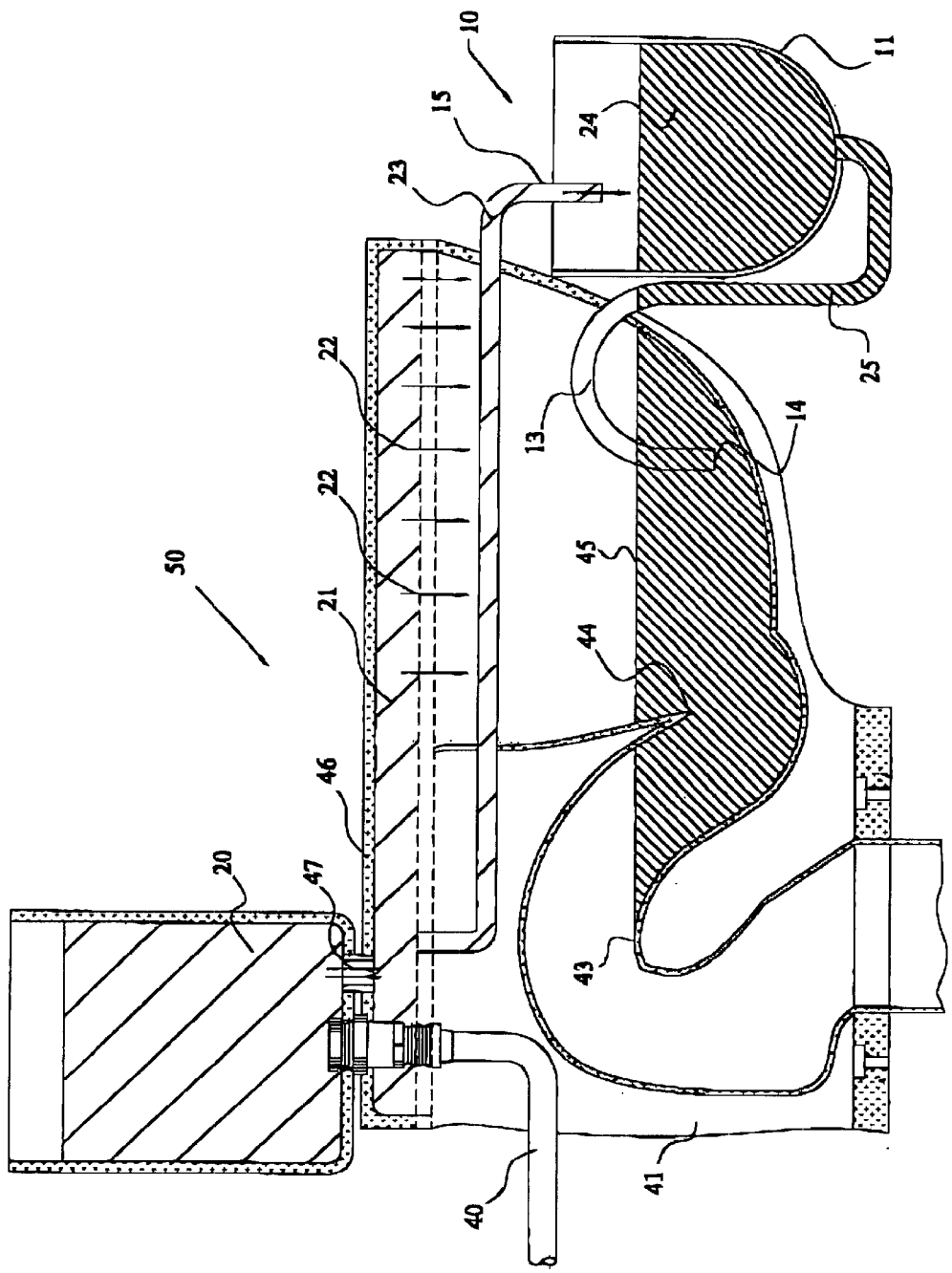
FIG. 1 is a side view, partly in section, of an automatic pet watering device in accordance with the invention.

Referring now to the drawings, wherein like numerals designate like and corresponding parts throughout the several view, numeral 50 generally designates a typical water closet toilet which is installed in most bathrooms and the watering device of the invention is designated overall with the numeral 10. Inlet tube 40 supplies water 20 which is discharged during normal flushing through aperture 47 through top cap 46. Water 21 then flows down as shown by arrows 22 down into position as water 45. Lips 43 and 44 control the eventual water level 45. During the flushing, water 23 flows down through tube 15 to fill water bowl 11. Water 24 is maintained at the same level as water level 45 by reason of its flowing during filling through trap tube 13 and outlet 14. By reason of the natural behaviour of water, once the water level 45 has been reached, no further water can flow through trap tube 13 and water level 24, 25 and 45 reach equilibrium The equilibrium thus described is achieved by reason of the relationship between water level 45 as set by lip 43, the height of trap tube 13 and watering device 10 and the cessation of water flow 21 simultaneously to both the toilet bowl 41 itself and through tube 15 to the watering device 10.

Drainage from watering device 10 is not dependent entirely upon the siphoning effect caused by a reduction of water level 45 because water flow 23 into the watering device 10 will effectively flush water 24 through trap tube 13 until water 20, 21 and 22 cease to flow.

Figure 2:
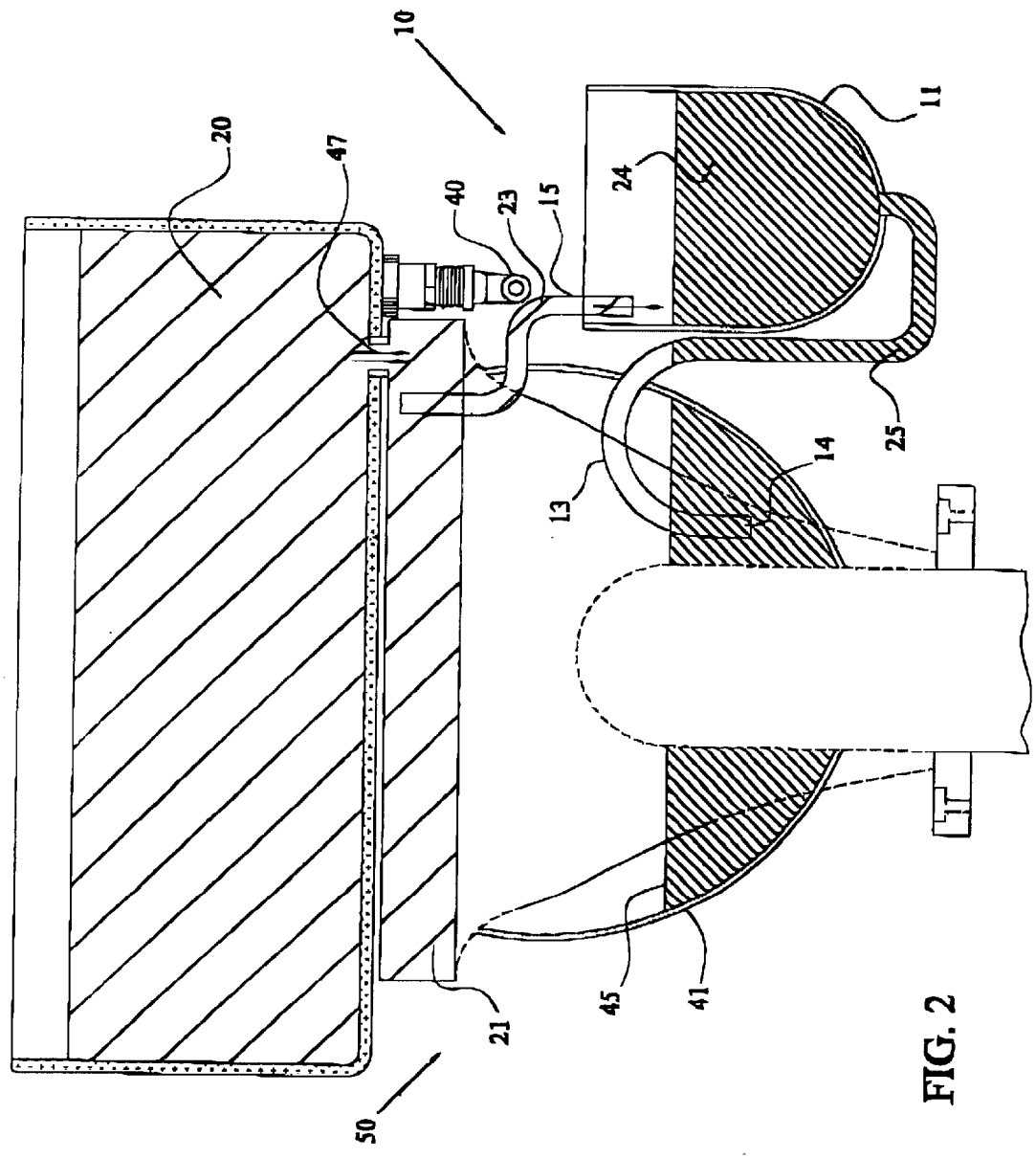
FIG. 2 is a rear view, partly in section, of an automatic pet watering device in accordance with the invention.

Referring now to FIG. 2, wherein the operational position of watering device 10 is shown adjacent to the side of the toilet bowl 41. This is the more usual location for watering device 10.

Figure 3:
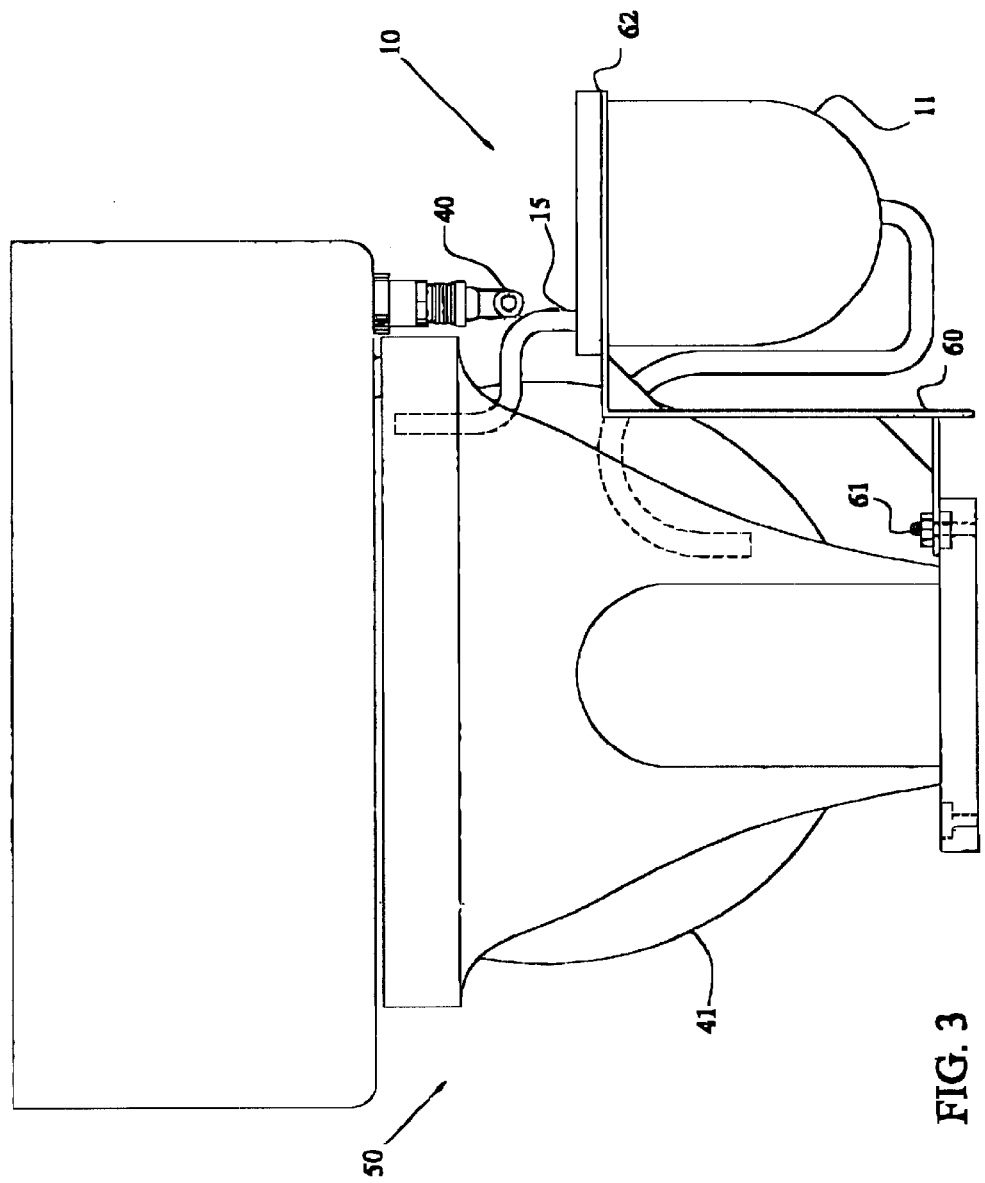
FIG. 3 is a rear of a second embodiment in accordance with the invention.

FIG. 3 shows a possible method of attaching watering device 10, by attachment means 61, to blow 17. Vertical support 60 and horizontal support 62 are shown here beneath a lip on water device 10.

The instant invention lends itself to adaptation to different toilet configurations and styles by reason of its mountability using a variety of possible attachment means and by the wide availability of flexible and non flexible tubing and sealing adhesives by which said tubing can be affixed in position between said watering device 10 and the toilet installation being used.

Presently Preferred Embodiment

Figure 4:
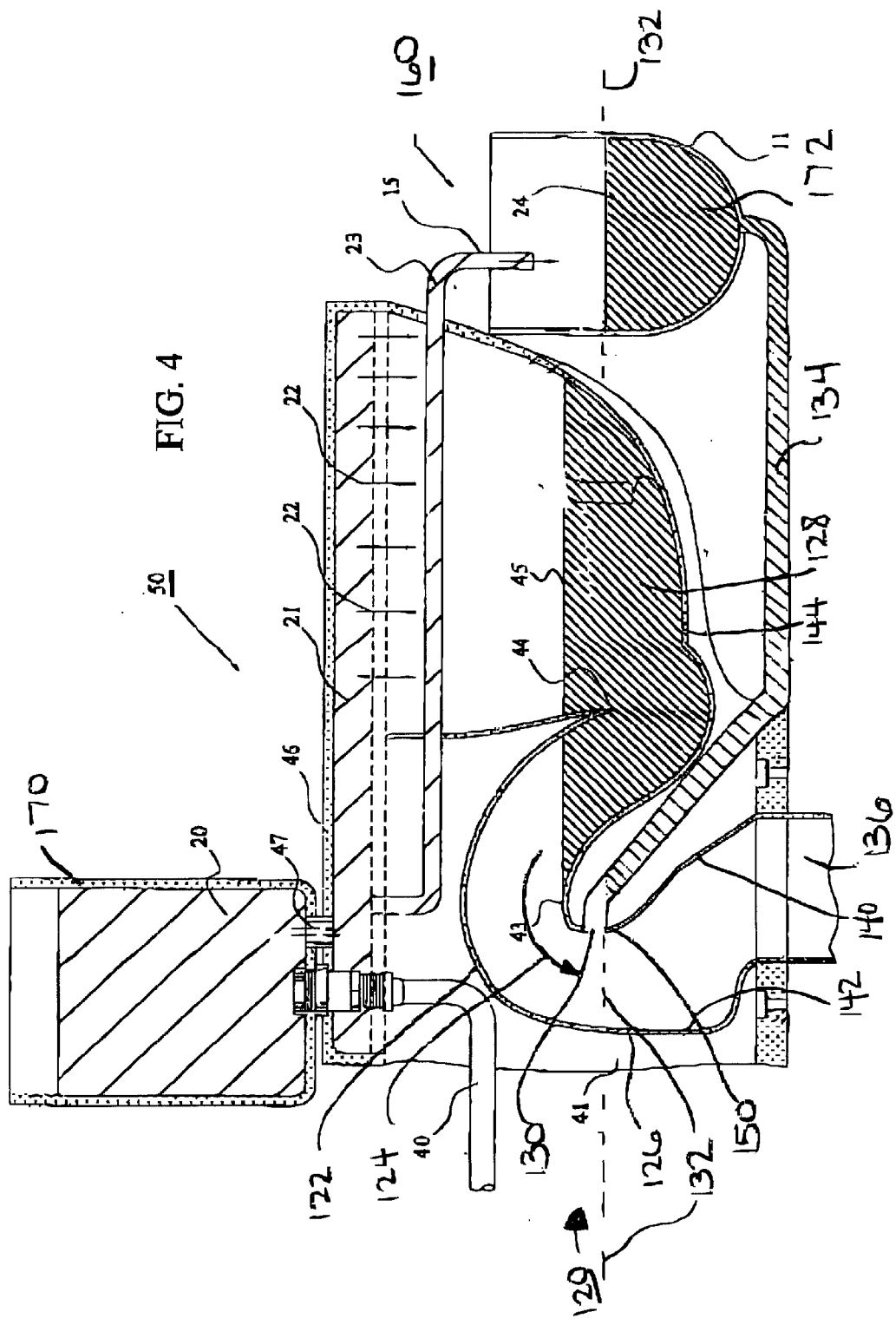
FIG. 4 is a side view, partly in section of an alternate embodiment of an automatic pet watering device in accordance with the invention.

Referring now to FIG. 4, in a presently preferred embodiment, the present invention, an automatic pet watering device is shown generally as 160 and comprises many of the same elements as the watering device 10 shown in FIG. 1 with the major modification being that trap tube 13 is replaced with a discharge conduit 134 being a hollow tube which does not lead into toilet bowl 144, but rather into down spout 126 of air trap 120. The up stream components meaning upstream of water bowl 11 are essentially the same in that during the flushing of water closet toilet 50, water 20 out of toilet tank 170, flows through aperture 47 and into top cap 46 where water 21 and 22 is distributed and flows into toilet bowl 144 and some of water 23 flows through tube 15 filling water bowl 11 in the exactly same manner in the previous embodiment, namely watering device 10.

In the presently preferred embodiment, however trap tube 13 is no longer present and instead is replaced with discharge conduit 134 being a hollow tube.

In a conventional water closet toilet 50, after a flush has been completed, the water level 45 in toilet bowl 144 is determined by the height of lip 43 and creates an air trap 120 not allowing air to move from drain 136 up into the toilet bowl 144. Air trap 120 includes elbow 122, lip 43 as previously described determining water level 45, down spout 126 having an outer wall 142 and an inner wall 140 as shown in FIG. 4, wherein down spout 126 leads into drain 136.

In the presently preferred embodiment, discharge conduit 134, being a hollow tube is led into down spout 126 somewhere just below water level 45 and in the air space created by air trap 120. As shown in FIG. 4, discharge conduit 134, being a hollow tube enters down spout 126 at outlet orifice 130 and has a outlet lip 150 which determines water level 132 in water bowl 11. It will be apparent to those skilled in the art that water level 132 and water bowl 11 may be at a different level than water level 45 in toilet bowl 144. The height of outlet lip 150 is the determining factor of the water level 132 within water bowl 11.

In Use

When water closet toilet 50 is flushed, as described above, water flows into water bowl 11 from top cap 46 which is clean water 20 from toilet tank 170 and water exits out of water bowl 11 via a discharge conduit 134 which empties into down spout 126 of air trap 120 at outlet orifice 130. During a flush of course, water 128 out of toilet bowl 144 is urged over lip 43 and in the flushed water direction as shown by arrow 124 in FIG. 4. The water rushing past outlet orifice 130 has a venturi and/or syphoning effect, thereby removing water 172 from water bowl 11 until it finds its level at water level 132.

Those skilled in the art will see that the advantageous of positioning outlet orifice 130 in air trap 120 rather than as in the previous embodiment into toilet bowl 144 is that any debrett and/or contamination found in water 128 located in toilet bowl 144 will likely not get entrained into water 172 of water bowl 11 because firstly, the water is not stationary or standing in the air trap 120, but rather moving vigorously pass outlet orifice 130 at any given time and secondly when water is moving through elbow 122 and down spout 126, it acts as a venturing or syphoning action removing or sucking water out of discharge conduit 134 at outlet orifice 130 as fresh water it entering water bowl 11 through tube 15 simultaneously.

Those skilled in the art will also see that it is possible to locate outlet orifice 130 in either the inner wall 140 or the outer wall 142 or possibly anywhere around the outer periphery of down spout 126 which is a convenient locations for the attachment of water bowl 11 to the outside of water closet toilet 50.

It will also be apparent to those skilled in the art that even though the preferred location of outlet orifice 130 is below lip 43 there is no reason why outlet orifice 130 could not be located any where on elbow 122 provided there is no standing water adjacent outlet orifice 130. For example if outlet orifice 130 is located above standing water level 45 the water level 132 within water bowl 11 would be higher than the standing water level 45 within toilet bowl 144. Naturally water bowl 11 would have to be tall enough to maintain the higher water level. Entrainment of impurities is prevented by ensuring that water outlet 130 is located adjacent air within elbow 122 or down spout 126.

Figure 5:
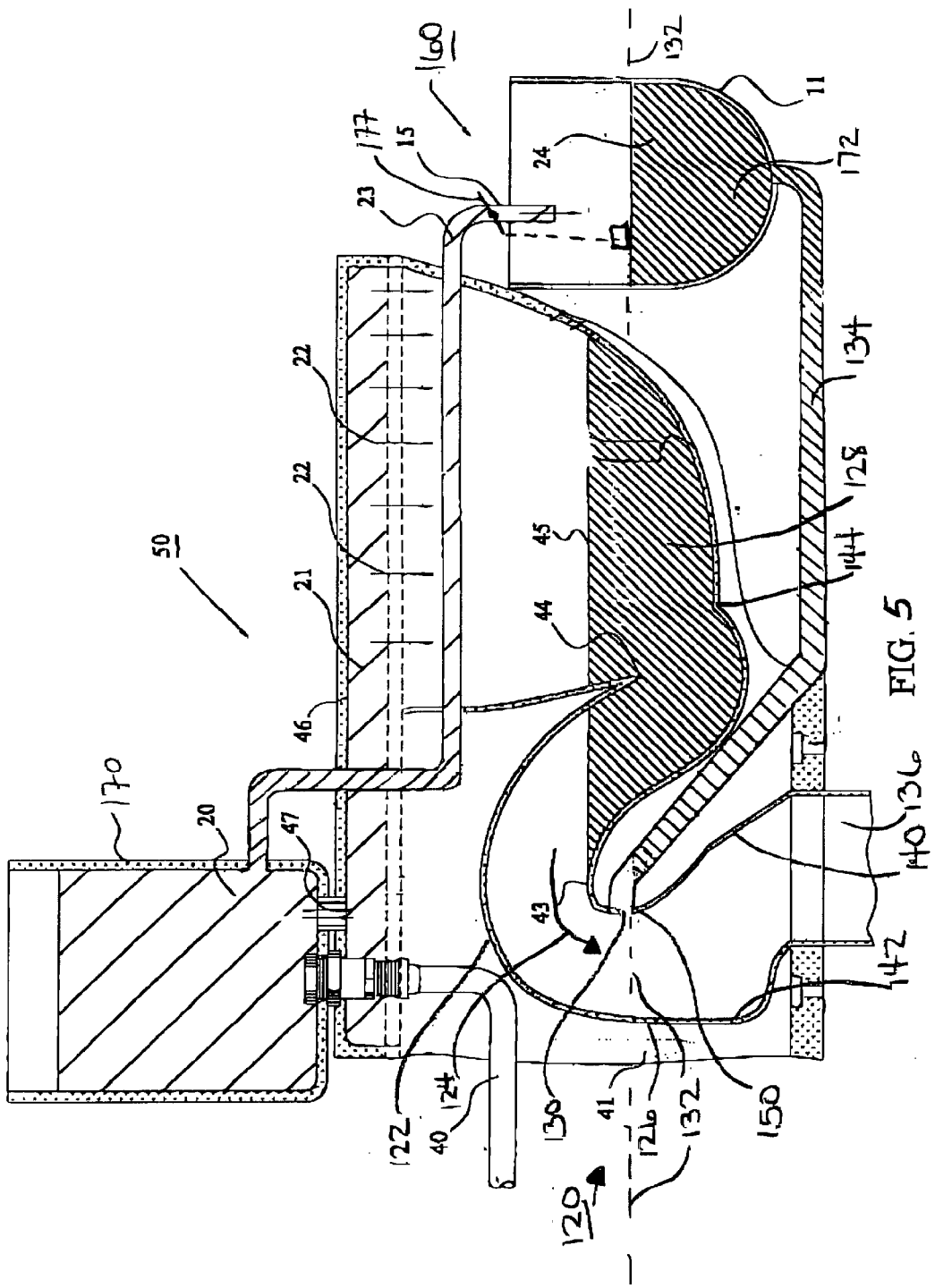
FIG. 5 is a side view, partly in section of an alternate embodiment of an automatic pet watering device in accordance with the invention, showing water tank as water source with a water level valve.

An alternate presently preferred embodiment is shown in FIG. 5, which is most respects is the same as the embodiment shown in FIG. 4, with the exception that tube 15 is shown connecting to toilet tank 170 rather than to top cap 46. In this alternate embodiment, rather than obtaining water from the top cap 46 of the water closet toilet 50, it may be preferable to obtain water from toilet tank 170 in that way filling of water bowl 11 is not dependant upon flushing of the toilet.

In this case to avoid constant flowing of the water from toilet tank 170 into water bowl 11, a water level valve 177 shown in FIG. 5 would be required. Water valve 177 is shown schematically only and those skilled in the art will of course be familiar with the many types of water level valves that currently are commercially available which would suite the purpose of controlling the water flow through tube 15 and into water bowl 11 to a desired water level 132.

In all other aspects, the operation of the presently preferred embodiment shown in FIG. 5 operates in the same manner as the embodiment shown in FIG. 4, with the exception of obtaining the water the water connection of tube 15 through toilet tank 170 and the addition of a water level valve 177 for controlling water level 132 within water bowl 11.

While the above description constitutes preferred embodiments of the present invention, it will be appreciated that the invention is susceptible to modifications, variation and change without departing from the proper scope and fair meaning of the accompanying claims.

It should be apparent to persons skilled in the arts that various modifications and adaptation of this structure described above are possible without departure from the spirit of the invention the scope of which defined in the appended claim.

I claim:

1. An automatic pet watering device installed on a conventional toilet having a top cap, said watering device comprising:

(a) a water bowl in fluid communication with a top cap of a toilet;

(b) said water bowl receiving clean water from a top cap of a toilet during flushing of a toilet;

(c) said water bowl further including a water outlet means for discharging excess water to a toilet drain; and (d) whereby flushing said toilet automatically fills said water bowl and if necessary simultaneously empties a quantity of water to achieve a preselected water level in the water bowl.

2. An automatic pet watering device installed on a conventional toilet having a top cap, said watering device comprising:

(a) a water bowl in fluid communication with a top cap of a toilet;

(b) said water bowl receiving clean water from a top cap of a toilet during flushing of a toilet;

(c) said water bowl further including a water outlet means for discharging excess water to a toilet drain;

(d) whereby flushing said toilet automatically fills said water bowl and if necessary simultaneously empties a quantity of water to achieve a preselected water level m the water bowl; and (e) wherein said outlet means in fluid communication with a toilet air trap such that the water level in the water bowl is established above or below the standing water level in the toilet bowl.

3. An automatic pet watering device of claim 1, wherein said outlet means in fluid communication with the toilet bowl such that the water level in the water bowl is established at substantially the standing water level in the toilet bowl.

4. An automatic pet watering device of claim 1, wherein said outlet means in fluid communication with a toilet down spout such that the water level in the water bowl is established at or below the standing water level in the toilet bowl.

5. An automatic pet watering device of claim 4, wherein said outlet means further includes an outlet orifice defining the location where said outlet means empties into said down spout, said outlet orifice located such that the water level in the water bowl is established at or below the standing water level in the toilet bowl.

6. An automatic pet watering device of claim 5, wherein said outlet means further includes a hollow tube, including one end in fluid communication with the bottom of said water bowl and the other end in fluid communication with said outlet orifice.

7. An automatic pet watering device of claim 1, wherein said water bowl is located near a side of said toilet bowl and fastened to said toilet bowl with a vertical support and a horizontal support.

8. An automatic pet watering device installed on a conventional toilet having a toilet tank said watering device comprising:

(a) a water bowl in fluid communication with a toilet tank of a toilet;

(b) said water bowl receiving clean water from a toilet tank of a toilet during flushing of a toilet;

(c) said water bowl further including a water outlet means for discharging excess water to a toilet drain; and (d) whereby flushing said toilet automatically fills said water bowl aid if necessary simultaneously empties a quantity of water to achieve a preselected water level in the water bowl.

* * * * *